United States Patent
Yarosh et al.

(10) Patent No.: US 9,456,178 B2
(45) Date of Patent: *Sep. 27, 2016

(54) SYSTEM AND METHOD FOR PROVIDING SEPARATE COMMUNICATION ZONES IN A LARGE FORMAT VIDEOCONFERENCE

(71) Applicant: AT&T INTELLECTUAL PROPERTY I, LP, Atlanta, GA (US)

(72) Inventors: Svetlana Yarosh, Jersey City, NJ (US); Shankar Krishnan, Chatham, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,231

(22) Filed: Nov. 25, 2015

(65) Prior Publication Data

US 2016/0080691 A1 Mar. 17, 2016

Related U.S. Application Data

(63) Continuation of application No. 13/866,989, filed on Apr. 19, 2013, now Pat. No. 9,232,183.

(51) Int. Cl.
*H04N 7/14* (2006.01)
*H04N 7/15* (2006.01)

(52) U.S. Cl.
CPC .............. *H04N 7/147* (2013.01); *H04N 7/144* (2013.01); *H04N 7/15* (2013.01)

(58) Field of Classification Search
USPC ........................................................ 348/14.08
See application file for complete search history.

(56) References Cited

U.S. PATENT DOCUMENTS

| 6,624,841 B1* | 9/2003 | Jullien | H04N 7/142 348/14.01 |
|---|---|---|---|
| 8,164,617 B2 | 4/2012 | Mauchly | |
| 9,014,059 B2 | 4/2015 | Richardson et al. | |
| 9,014,089 B2* | 4/2015 | Miyagawa | H04L 63/30 370/328 |

(Continued)

FOREIGN PATENT DOCUMENTS

| WO | 2007123946 A2 | 11/2007 |
| WO | 2010111275 A1 | 9/2010 |

OTHER PUBLICATIONS

"Video conferencing room primer", Cisco Systems, Inc., 2011.

(Continued)

*Primary Examiner* — Amal Zenati
(74) *Attorney, Agent, or Firm* — Guntin & Gust, PLC; Douglas Schnabel

(57) ABSTRACT

A system that incorporates the subject disclosure performs, for example, displaying a video image of a remote scene at a display surface, wherein the remote scene is remote from the display surface. Overlapping video images are obtained from different vantage points of a local scene observable from the display surface. A composite video image is generated of the local scene from the video images and forwarded to the remote location. A first audio signal is generated representing first sounds associated with a first region of the local scene without representing other sounds associated with a second region of the local scene. The first audio signal is forwarded to audio processing equipment at the remote location to present the first sounds at a first region of the remote scene at the remote location without presenting the first sounds at a second region of the remote scene. Other embodiments are disclosed.

20 Claims, 11 Drawing Sheets

(56) References Cited

U.S. PATENT DOCUMENTS

| | | |
|---|---|---|
| 2003/0169818 A1 | 9/2003 | Obrador |
| 2005/0129325 A1 | 6/2005 | Wu |
| 2006/0028489 A1 | 2/2006 | Uyttendaele et al. |
| 2007/0031062 A1 | 2/2007 | Pal et al. |
| 2010/0115411 A1 | 5/2010 | Sorokin et al. |
| 2010/0245535 A1* | 9/2010 | Mauchly ............ G06T 7/0075 348/14.08 |
| 2011/0080496 A1 | 4/2011 | Givon |
| 2011/0103624 A1 | 5/2011 | Ferren |
| 2012/0287223 A1 | 11/2012 | Zhang et al. |
| 2012/0300044 A1 | 11/2012 | Thomas et al. |
| 2012/0314015 A1 | 12/2012 | Watson et al. |
| 2013/0010144 A1 | 1/2013 | Park |

OTHER PUBLICATIONS

Wilson, Andrew D., "TouchLight: An Imaging Touch Screen and Display for Gesture-Based Interaction", ICMI, 2004.

Yarosh, et al., "Video Playdate: Toward Free Play across Distance", CHI, 2009.

* cited by examiner

SYSTEM AND METHOD FOR PROVIDING SEPARATE COMMUNICATION ZONES IN A LARGE FORMAT VIDEOCONFERENCE

CROSS-REFERENCE TO RELATED APPLICATION(S)

This application is a continuation of U.S. patent application Ser. No. 13/866,989 filed Apr. 19, 2013 by Yarosh et al., entitled "System and Method for Providing Separate Communication Zones in a Large Format Videoconference." All sections of the aforementioned application(s) are incorporated herein by reference in its entirety.

FIELD OF THE DISCLOSURE

The subject disclosure relates to a system and method for providing separate communication zones in a large format videoconference.

BACKGROUND

As the adoption of videoconferencing technology is becoming more widespread in both home and office environments, there are trends toward an immersive experience, referred to as telepresence. Systems supporting a telepresence experience can include telepresence sites having one or more traditional video cameras and relatively large displays, e.g., projection displays that can offer life-sized images of participants at remote telepresence sites. As bandwidth and other infrastructure begin to support larger video displays for videoconferencing, inconsistencies will become more apparent between how a traditional camera usually captures an image for videoconferencing and the metaphor that is most natural for remote interaction. For example, when the various participants are at a range of different distances from a local video camera, captured images of those participants closest to the video camera may be distorted, or even cropped if any part of them happens to extend outside of a field of view of the video camera. Consequently, presentation of the participants on a display wall of a remote telepresence site will appear distorted and/or cropped. Accordingly, it is not readily apparent where a camera or cameras can be placed, and how each camera's video should be processed to produce a meaningful illusion of presence.

The "TouchLight" imaging touch screen and display for gesture-based interaction, developed by Microsoft® Research division of Microsoft® Corporation of Redmond, Wash., is an example of a display that provides a camera located behind a semi-transparent display screen. Unfortunately, such configurations impose restrictions on the types of displays, as well as on requirements for unobstructed physical space behind the display. It is unclear how such display systems could be mounted on an existing surface, such as a conference room wall, without opening the wall to provide access to physical space located behind the wall.

BRIEF DESCRIPTION OF THE DRAWINGS

Reference will now be made to the accompanying drawings, which are not necessarily drawn to scale, and wherein.

DETAILED DESCRIPTION

Figure 1:
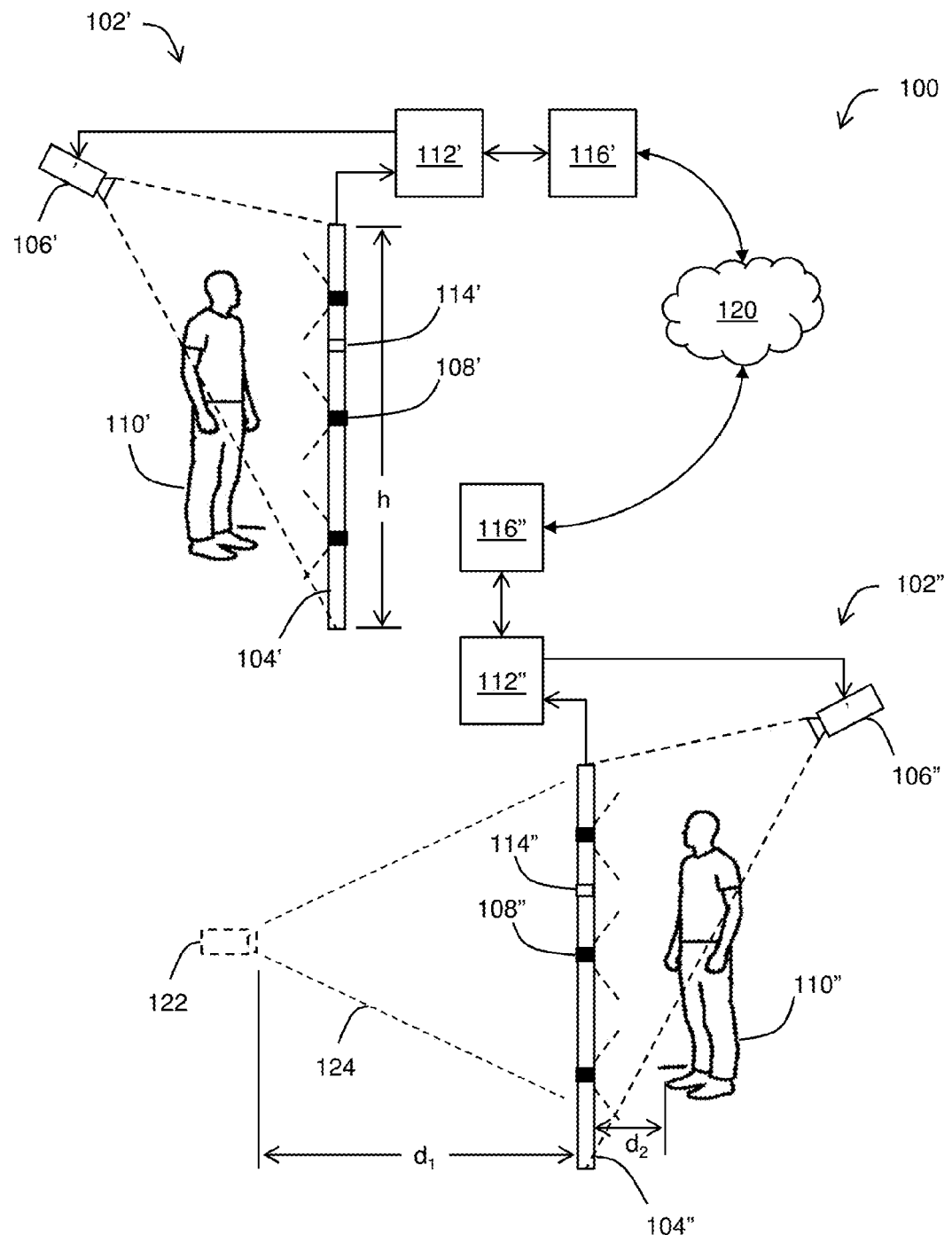
FIG. 1 depicts an illustrative embodiment of a telepresence system.

The subject disclosure describes illustrative embodiments of providing separate communication zones within a large format videoconference. Other embodiments are included in the subject disclosure.

One embodiment of the subject disclosure includes a system including a display device to provide a video display of a remote scene at a display surface, wherein the remote scene is remote from the system. The system also includes a number of video cameras positioned across the display surface. The video cameras are aimed at a local scene, proximate to the display surface. Each video camera has a respective field of view to capture a respective portion of the local scene. A first microphone is provided to generate a first audio signal representing first sounds from a first region of the local scene without representing other sounds from a second region of the local scene. A first speaker is provided to generate audio at the first region of the local scene without generating audio at the second region of the local scene. The audio corresponds to sounds originating at a first region of the remote scene. The system also includes a memory to store instructions and a video processor coupled to each video camera. The video processor, responsive to executing the instructions, performs operations including generating a composite image of the local scene from respective portions of the local scene.

Another embodiment of the subject disclosure includes a process including displaying, by a system comprising a processor, a video image of a remote scene at a display surface. The video image of the remote scene is obtained from video processing equipment at a location that is remote from the system. A number of overlapping video images of a local scene observable from a vantage point of the display surface is obtained, by the system. The overlapping video images are obtained from a number of different vantage points spatially separated across the display surface. A composite video image is generated of the local scene from the overlapping video images. The composite video image is forwarded to the video processing equipment at the remote location. A first audio signal is generated representing first sounds associated with a first region of the local scene without representing other sounds associated with a second region of the local scene. The first audio signal is forwarded to audio processing equipment at the remote location for presentation by the audio processing equipment of the first sounds at a first region of the remote scene at the remote location without presentation by the audio processing equipment of the first sounds to a second region of the remote scene at the remote location.

Yet another embodiment of the subject disclosure includes a computer-readable storage device comprising instructions that when executed by a processor, cause the processor to perform operations including displaying a video image of a remote scene of a remote location at a display surface. The remote scene is obtained from video processing equipment at a remote location geographically separated from the display surface. A number of overlapping video images is obtained of a local scene observable from a vantage point of the display surface. The multiple overlapping video images are obtained from a number of different vantage points spatially separated across the display surface. A composite video image of the local scene is generated from the overlapping video images. The composite video image is forwarded to the video processing equipment at the remote location. A first audio signal is generated representing first sounds associated with a first region of the local scene without representing other sounds associated with a second region of the local scene. The first audio signal is forwarded to audio processing equipment at the remote location for presentation by the audio processing equipment of the first sounds at a first region of the remote scene at the remote location without presenting by the audio processing equipment the first sounds to a second region of the remote scene at the remote location.

In order to support video-mediated communication with large format displays, the problem of camera positioning needs to be solved as it relates to indexality (e.g., an ability to point or look at something in the remote space and have the remote person be aware of your pointing direction or gaze) and social distance as in proxemics. Proxemics, a subcategory of the study of nonverbal communications, relates to one's use of space as a specialized elaboration of culture. A concept of a personal reaction bubble has been attributed to Edward T. Hall that identifies radially differentiated zones about an individual. Such zones include an intimate space as being a zone extending from an individual to about 1.5 feet away from the individual. So called personal space extends from about 1.5 feet to about 4 feet, social space from about 4 feet to about 12 feet, and public space from about 12 feet to about 25 feet. Thus, proxemics can indicate how far individuals want to be from each other while talking. Intimate conversations might take place in the intimate space, while more general conversations can bake place within the personal or social spaces. The distance dictated by proxemics is halved when communicating with others by way of a videoconference or telepresence screen, as the telepresence screen can be perceived as being between the participants. Current video cameras used with large display telepresence systems are not necessarily responsive to such socially appropriate distances, especially for intimate conversations. Participants approaching the display surface to realize conversations in the personal or intimate spaces will be subject to the video distortions and/or cropping of traditional video cameras.

The techniques disclosed herein include an array of video cameras that can include a one dimensional, e.g., spaced apart along a line, or a multi-dimensional, e.g., spaced apart in a 2-dimensional, array of video cameras (sometimes referred to as a "camera mesh"). Overlapping video images obtained from respective fields of view of the different video cameras of the array are processed into a composite video image and sent to the remote participant. It has been recognized by the authors that two-dimensional arrays of video cameras can be built into existing display surfaces, such as video display screens and existing environments. Video display screens can include cathode ray tube displays, light-emitting diode (LED) displays, electroluminescent displays, plasma displays, liquid crystal displays (e.g., thin film transistor liquid crystal (LCD) displays, LED backlit LCD displays), organic light emitting diode displays, surface-conduction electron-emitter displays, electronic paper, laser displays, projection displays, such as digital light processing (DLP) displays and the like. Respective video frames of the overlapping video images from the video cameras of the video camera array are combined, or otherwise "stitched" into composite video frames of a composite video image for transmission. Advantageously, two-dimensional camera arrays can be mounted to virtually any surface, including amorphously shaped surfaces (for example, a "cave" of a video-chat "tent" including one or more of curved or angled display surfaces) and work without significant modifications to the system. The video camera arrays can also be scaled to any size display surface by adding more cameras.

The techniques disclosed herein are applicable to a home domain, e.g., extending capabilities of services, such as voice over internet protocol (VoIP) services, including Skype® VoIP communications application commercially available from Microsoft® Corporation of Redmond, Wash., to an office domain, extending features and capabilities of videoconference facilities, to laboratory domains supporting collaborative activities, and more generally to other public domains, such as schools, libraries, museums, stadiums, sporting venues, etc.

FIG. 1 depicts an illustrative embodiment of a telepresence system 100 that includes a first telepresence site including a first telepresence terminal 102' and a second telepresence site including a second terminal 102". In some instances, the first telepresence site is referred to as a "local" site, with the second telepresence site being referred to as a "remote" site with respect to the local site. The phrases local and remote are relative and meant to suggest a physical separation between the first and second telepresence sites. In at least some embodiments, the physical separation is a geographic separation in that the local and remote telepresence sites can be located in different parts of the same building, different buildings of a common complex of buildings, or separate otherwise unrelated buildings and/or complexes.

The first telepresence terminal 102' includes a first display surface 104' illuminated by a first projector 106'. The first projector 106' projects a video image of a remote scene captured by the second telepresence terminal 102". The first telepresence terminal 102' also includes a first array of video cameras 108' arranged to be aimed to capture overlapping video images of a local scene proximate to the first telepresence terminal 102'. Each video camera of the first array of video cameras 108' has a respective field of view arranged to capture a respective portion of the local scene. For example, each video camera of the first array of video cameras 108' can be aimed at a common point or location identified at or beyond a distance or range with respect to the display surface 104', e.g., 1', 2.5', 5', 10', 20', 50', 100', infinity. In the illustrative example, the local scene includes an area adjacent to the first display surface 104' including a first participant 110' positioned in front of the first display surface a 104'. As will be described in more detail below, the first display surface 104' is relatively large, e.g., approximately as large or larger than the first participant 110', and the first array of video cameras 108' is positioned in or adjacent to the first display surface 104'.

Each video camera of the first array of video cameras 108' and the projector 106' are coupled to a first video processor 112'. In at least some embodiments, the first telepresence terminal 102' also includes at least one microphone 114'. The first video processor 112' is configured to combine separate video images obtained from each video camera of the first array of video cameras 108' into a composite video image representative of the remote scene. For video images including a series of frames, e.g., thirty frames per second, the composite video image includes a series of composite frames of the remote scene. The first video processor 112' is also configured to format a composite video signal of the composite video image for example encoding the composite video signal according to one or more video standards. Some examples of video standards include digital video using the MPEG-2 video codec, such as the Advanced Television Systems Committee (ATSC) standards, Digital Video Broadcast (DVB) standards, Integrated Services Digital Broadcasting (ISDB) standards, and the Digital Multimedia Broadcasting (DMB) standards. Other examples of video standards include analog video standards, such as the National Television System Committee (NTSC) standards, the Phase Alternating Line (PAL) standards, etc.

An output of the first video processor 112' of the first telepresence terminal 102' is input to a first communication processor 116'. The first communication processor 116' reformats or otherwise conditions the composite output video signal received from the first video processor 112' into a first communication signal for transport to a remote destination. The first communication signal is transported across a network 120 to a remote network destination. In the illustrative embodiment, the remote network destination is associated with a remote telepresence site including a second communication processor 116" associated coupled to the second telepresence terminal 102".

The second telepresence terminal 102" includes a second display surface 104" illuminated by a second projector 106". The second projector 106" projects an image of a local scene of the first telepresence site captured by the first telepresence terminal 102'. The second telepresence terminal 102" also includes a second array of video cameras 108" arranged to capture a remote scene of the second telepresence site, captured by the second telepresence terminal 102". In the illustrative example, the remote scene includes a second participant 110" positioned in front of the second display surface a 104".

Each of the video camera of the second array of video cameras 108" and the second projector 106" are coupled to a second video processor 112". In at least some embodiments, the second telepresence terminal 102" also includes at least one microphone 114". The second video processor 112" is also configured to combine separate video images from each video camera of the second array of video cameras 108" into a second composite video image representative of the local scene.

An output of the second video processor 112" of the second telepresence terminal 102" is input to a second communication processor 116". The second communication processor 116" reformats or otherwise conditions a second composite output video signal of the composite video image from the second video processor 112" into a second communication signal for transport to a remote destination. The second communication signal is transported across the network 120 to a remote network destination. In the illustrative embodiment, the remote network destination is the first communication processor 116' associated with the first telepresence terminal 102'.

As shown in more detail at the second telepresence terminal 102", the second participant 110" is standing in front of the second display surface 104" at a distance $d_2$ measured from the second display surface 104". Each video camera of the second array of video cameras 108" has a respective field of view represented by the dashed lines extending away from the second display surface 104". At relatively close distances, no single video camera of the second array of video cameras 108" captures an entire image of the second participant 110". However, the respective overlapping fields of view of several video cameras of the second array of video cameras 108" collectively include the entire image of the second participant 110". As will be described further below, the second video processor 112" combines video images from the video cameras of the second array of video cameras 108" into a single composite video image. The composite video image is representative of a composite image processed from the individual video images of the video cameras of the second array of video cameras 108". A plausible composite video image of the remote scene is such that a virtual, non-traditional video camera 122 positioned at a distance $d_1$ behind a second display surface 104" would result in a video signal approximating the composite image. A representative virtual field of view 124 is illustrated with respect to the virtual video camera 122.

In operation, the first participant 110' at the first telepresence terminal 102' observes the composite image of the second participant 110" at the second telepresence terminal 102". The first communication processor 116' receives the second communication signal from the second telepresence terminal 102" and extracts the second composite video signal. The first video processor 112' decodes the second composite video signal, as required, and otherwise renders a composite video image of the second participant 110" projected by the first projector 106' upon the first display surface 104'. Likewise, the second participant 110" at the second telepresence terminal 102" observes the composite image of the first participant 110'. The second communication processor 116" receives the first communication signal from the first telepresence terminal 102' and extracts the first composite video signal. The second video processor 112" decodes the first composite video signal, as required, and otherwise renders a composite video image of the first participant 110' projected by the second projector 106" upon the second display surface 104".

Microphones 114', 114" at each of the respective telepresence terminals 102', 102" capture audio at the respective telepresence terminals. The microphones 114', 114" (generally 114) produce audio signals that can be processed collectively, with the video at the respective video processors 112', 112" (generally 112) resulting in an audiovisual signal, or separately by way of audio processors (not shown). In either instance, the audio signals are also transported across the network 120 to provide each respective participant with an audiovisual presentation of the scene including the other participant of the videoconference.

Figure 2:
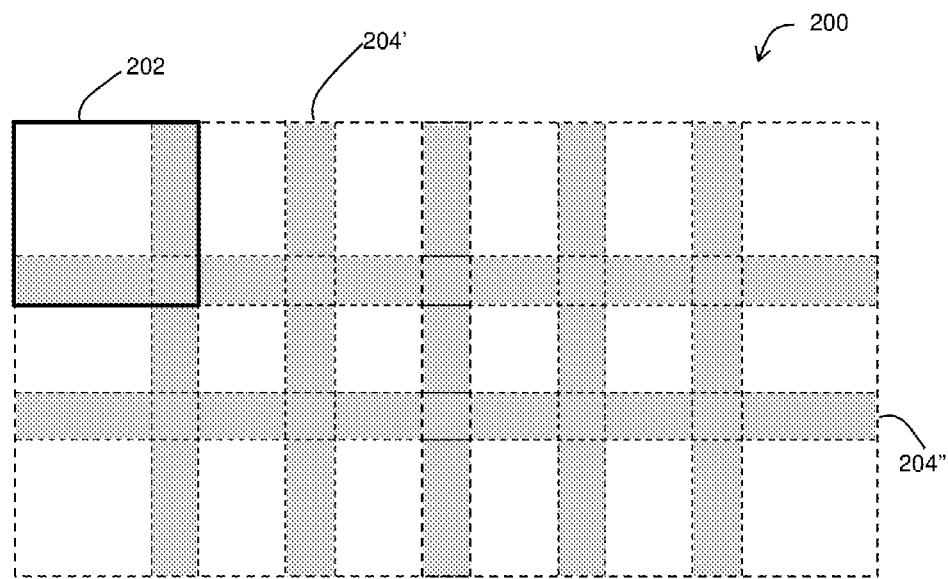
FIG. 2 depicts an example of a stitched image produced by the illustrative embodiment of the telepresence system of FIG. 1.

FIG. 2 depicts an example of a composite or stitched image produced by the illustrative embodiment of the telepresence system of FIG. 1. Respective video images of video feeds obtained from each of the video cameras of either of the video camera arrays 108', 108" (generally 108) can be combined into a composite image 200. In the illustrative example composite image is representative of a scene at a distance $d_5$ (FIG. 3) from a surface of the camera array 108 including 18 video cameras arranged in a 3×6 rectangular grid. Portions of the scene captured by respective images 202 from each of the video cameras 108 overlap at least partially with portions of the scene captured by respective images 202 of adjacent video cameras of the array of video cameras 108. At the distance $d_5$, the extent of overlap 204', 204" (vertical and horizontal) with adjacent images is minimal. At distances closer to the surface of the camera array will result in less image overlap 204', 204" (generally 204), with distances less than a threshold distance $d_4$ (FIG. 3) lacking any overlap and encountering blind spots between images from adjacent cameras. As such, a minimum distance of operation can be established at a distance $d_5$ slightly beyond the threshold distance $d_4$.

A process of combining the respective video images 202 into the composite video image can be referred to as "stitching" the video feeds together. The process can also be referred to as forming a camera "mesh" in which multiple overlapping video images are combined into a single composite video image. The video images 200, 202 can represent individual images contained in a video signal. The resulting video image includes a stream of such images, e.g., 30 frames per second. In at least some embodiments the video cameras of the video camera array 108 are synchronized such that each video camera provides a respective video frame at about the same time to facilitate processing of the composite video image 200.

Current approaches used to generate panoramic images from a series of separate images provide robust systems for stitching images taken by rotating a camera around a single point. The same techniques when applied to stitching images obtained from a translational transformation of a camera shot (e.g., obtained from two adjacent cameras on the same plane), present additional algorithmic concerns due to the effect of parallax.

Parallax relates to a displacement or difference in an apparent position of an object when viewed along two different lines of sight, as measured by an angle or semi-angel of inclination between the two different lines of sight. A parallax interpretation of an object can be performed utilizing respective fields of view of different video cameras. The principles of the parallax effect allows depth perception because each camera is seeing a slightly different view of the scene and objects in the foreground appear more extremely shifted than the objects in the background. The angles/semi-angles of inclination can be determined or otherwise estimated from the different views. When combined with a known spacing or separation between video cameras, an approximate range to an object within the field of view can be estimated. Thus, unlike rotational stitching systems, translational stitching necessarily considers depth of objects in the imaged scene. An example algorithm for producing camera mesh includes capturing a frame from each camera. Each adjacent set of camera images is rectified (e.g., a mathematical transformation is performed on each image to effectively remove small inconsistencies and lens-specific warping introduced by the camera. Each corresponding point in each adjacent set of images is compared using parallax to provide insight as to depths of objects in the imaged scene. The relevant images at each of the depth layers identified and stitched separately. For example, a view of objects in a background of a scene is stitched separately from objects in a foreground of the imaged scene.

In at least some embodiments, image processing is applied to video frames captured by the different video cameras of the video camera array. For example, image processing can be applied to identify one or more objects represented in the video frames. Object identification by way of image processing can include various techniques, such as appearance based methods, e.g., edge matching using edge detection, divide-and-conquer search, greyscale matching, gradient matching, histograms of receptive field responses and large model bases. Other techniques, without limitation, include so-called feature-based methods, such as interpretation trees, hypothesize and test, and so on. Once one or more objects in a scene have been identified, an estimate of a range from the video camera array, e.g., the display surface, to the object can be estimated, e.g., according to the parallax effect.

Preparation of a composite video frame can combine representations of one or more identified objects in video frames obtained from one or more video cameras of the array. The resulting composite image is generated to represent the favorable attributes disclosed herein. Namely, the composite video image simulates a virtual window into a remote space. Representation of objects in the composite video frame can depend upon a determined or estimated range to the object. For example, an object that is close to the display surface may be represented in video frames of a subset of the video images, whereas objects farther from the display surface may be represented in a larger subset, or even all of the video images of the video camera array. Image stitching of objects at closer ranges can differ from image stitching of objects that are at greater ranges, for example, applying different corrections for warping, etc.

Figure 3:
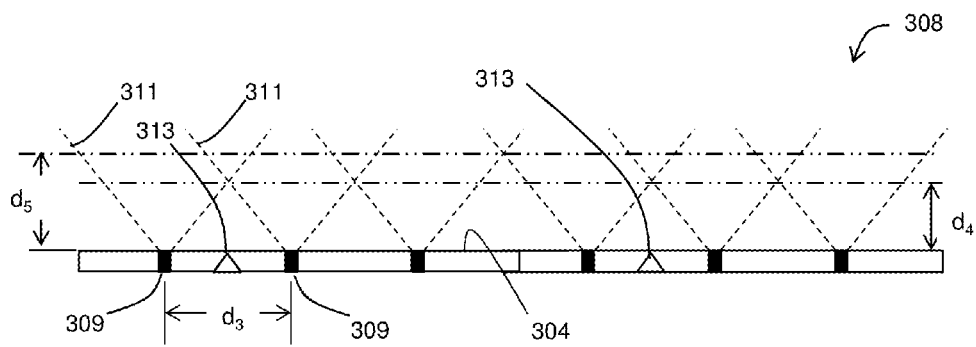
FIG. 3 depicts a top view of an illustrative embodiment of an integrated video camera array and video display surface of a telepresence system.

FIG. 3 depicts a top view of an illustrative embodiment of an integrated video camera array 308 and video display surface 304 of a telepresence system. In the illustrative embodiment, the video camera array 308 includes a 3×6 rectangular array of video cameras 309. A top view of the array 308 illustrates a separation distance $d_3$ between adjacent video cameras 309 of the video camera array 308 along one direction, e.g., a horizontal direction. In the illustrative embodiment, the rectangular array of video cameras 308 is arranged along a planar surface coincident with the display surface 304 of a videoconferencing or telepresence terminal. As illustrated, the video cameras 309 are embedded within or slightly behind the display surface 304.

Each of the video cameras 309 has a respective field of view 311. For example, standard off-the-shelf webcams such as the LifeCam Show®, commercially available from Microsoft Corporation of Redmond, Wash., provide a 67° diagonal field of view. At a distance of 1.5 feet away from the camera the camera will have a field of view is approximately 1.79 feet diagonal. Further, in the case of the LifeCam Show® web camera, the field of view as a 4×3 aspect ratio. Thus at a social distance of about 1.5 feet (about 0.25 meters when halved in consideration of the display surface) away from the camera the captured image covers an approximate rectangle of 1.43' by 1.07'. Considering the distance of 1.5 feet as a minimum distance $d_5$ of operation, the number of video cameras 309, as well as a separation between adjacent cameras 309 of the video camera array 308 can be established. In quarter to adequately cover the 4.29'×3.21' display using the LifeCam Show® cameras 309, will require a 3×3 camera array 308. Different arrangements of the video cameras 309 can be determined according to variations of any of the values, such as field of view or minimum operating distance or display size.

It is understood that in at least some embodiments the surface of the video camera array 308 can be in front of, at, or behind the display surface 304. It is further understood that in at least some embodiments the surface of the video camera array 308 can be non-planer. By way of illustrative example, a videoconferencing cave or tent can provide a display surface along one or more walls or surfaces of the cave or tent. The display surfaces can be angled with respect to each other, curved, continuous, discontinuous, or any suitable combination thereof. In any of such non-planer display configurations, the video camera array can substantially follow the non-planer display surface with a surface of the video camera array 308 being in front of, at, or behind the non-planar display surface.

Figure 4:
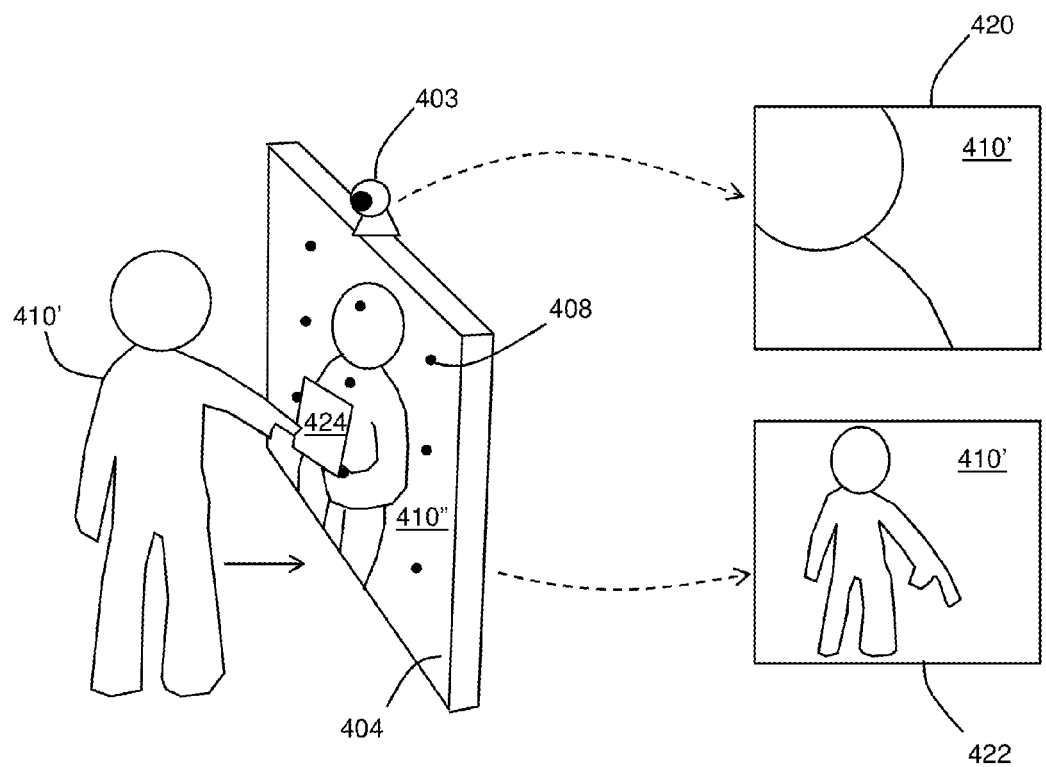
FIG. 4 depicts an illustrative embodiment of performance enhancements offered by the telepresence system of FIG. 1.

FIG. 4 depicts an illustrative embodiment of performance enhancements offered by the telepresence system of FIG. 1, using the display techniques of FIGS. 2 and 3. A first videoconference participant 410' is standing in front of a display surface 404. The display surface 404 is portraying a video image of a second video conference participant 410". The first participant 410' is standing relatively close to the display surface 404, e.g., within arm's length. A traditional videoconference camera 403 positioned at a top central location of the display surface 404 captures a respective image of the first participant 410' illustrated in a second displayed image 420. In the second display the image 420, only a portion of a head and upper body of the first participant is visible. The limited presentation of the first participant 410' in the second displayed image 420 results from the limited field of view of the traditional videoconference camera 403 positioned at the display surface 404.

A video camera array 408 positioned at display surface 404 captures another respective image of the first participant 410'. The result is illustrated in a third displayed image 422. In the third display the image 422, the entire body of the first participant 410' is visible. The presentation of the first participant 410' in the third displayed image 422 results from the benefits offered by the video camera array 409 and image stitching or camera meshing techniques disclosed herein. In particular, it is possible for the second participant 410" to perceive a direction at which the first participant is pointing. In this instance, the first participant 410' is pointing to an object 424 held by the second participant 410" as displayed in the first image.

In at least some embodiments, referring again to FIG. 3, the video camera array 308 is combined with one or more audio devices 313. The audio device 313 can include one or more microphones, speakers or any combination thereof. As shown in the illustration, two audio devices 313 provided for the video camera array 308. The two audio devices 313 are separated along the display surface 304. as will be described in more detail below, one or more of the microphones or the speakers of the audio devices 313 can be selected or otherwise designed to provide a video conference or telepresence audio signal associated with a region of the scenes within the vicinity of the audio device 313 without providing such audio to other regions of the scenes subject to the videoconference. Such localized audio can allow for private or at least semiprivate conversations between videoconference participants positioned within the region of the scene in the vicinity of the localized audio devices 313. When regional or localized audio is provided, more than one audio channel will be required to support the videoconference.

Figure 5A:
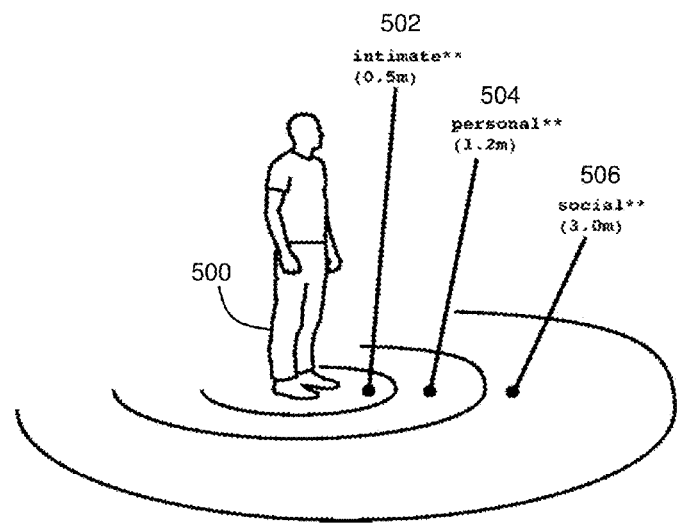
FIG. 5A depicts an illustrative example of different proxemic boundaries.

FIG. 5A depicts an illustrative example of different proxemic boundaries. Proxemics refers to a social study of the distances between people during different types of personal interactions. Though there are some cultural differences, there are fairly well-established guidelines. According to these guidelines, in intimate region can be identified within about 1.5 feet from an individual 500. An intimate region boundary 502 is shown extending about the individual at this distance. A personal region can be identified between the intimate region 502 and a distance of about 4 feet (1.2 meters) from the individual 500. A personal region boundary 504 is shown extending about the individual 500 at this distance. Likewise, a social region can be identified between the personal region boundary 504 and a distance of about 10 feet (3 meters) from the individual 500. A social region boundary 504 is shown extending about the individual 500 between the personal region boundary 504 and this distance.

Figure 5B:
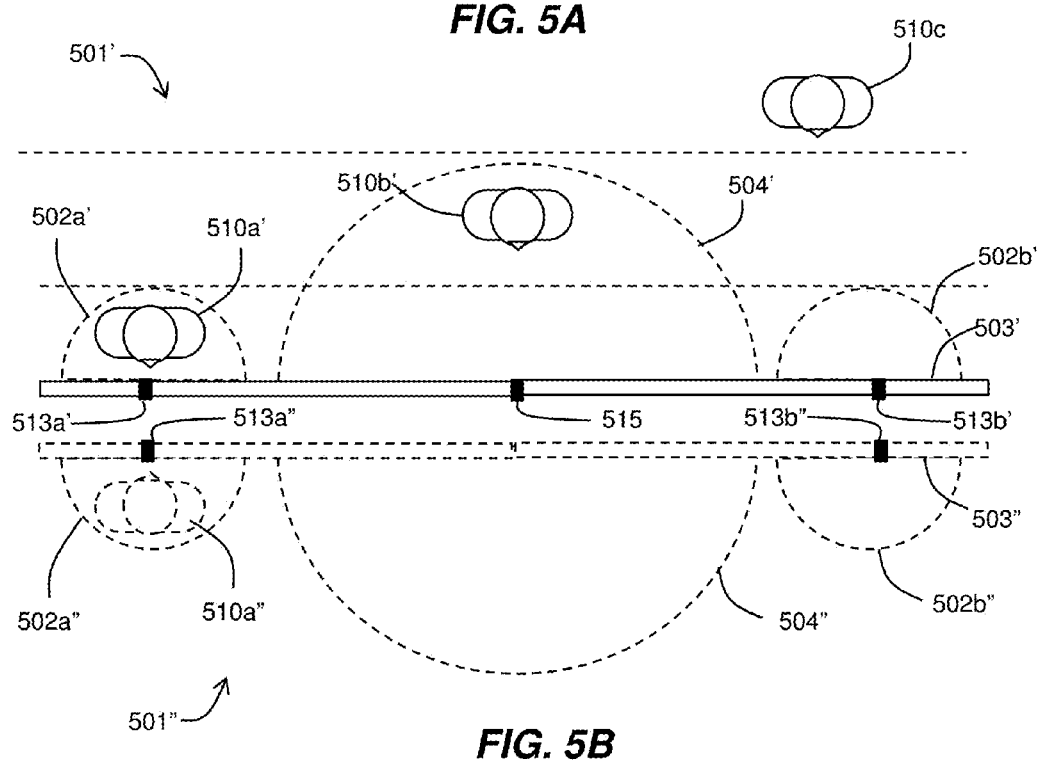
FIG. 5B depicts a top view of an illustrative embodiment of a telepresence system supporting communications within different proxemic zones.

FIG. 5B depicts a top view of an illustrative embodiment of a telepresence system supporting communications within different proxemic zones. At a first, e.g., local, video conference site 501', a first display surface 503' includes a first localized audio device 513a' towards a right hand portion of the first display surface 503' and a second localized audio device 513b' towards a left-hand portion of the first display surface 503'. Each of the first and second localized audio devices 513a, 513b (generally 513) includes a respective microphone to capture sounds from the local video conference site 501' and a respective speaker to provide at the local video conference site 501' with audio representative of sounds originating from a corresponding location of a remote video conference site 501". Depending upon selection and configuration of the localized audio devices, a region of audio coverage can be determined.

In the illustrative example, the first localized audio device 513a provides audio coverage within a first region 502a. The extent of the first region 502a, for example, can be selected according to any of the proxemic zones, such as the intimate zone 502a' illustrated. Shown in phantom is a second display surface 503" at the remote video conference site 501". The two sites 501', 501" are geographically separated, but shown here in juxtaposition for convenience, and to reinforce the perception to participants in each of the sites 501', 501". The second display surface 503" also includes a first localized audio device 513a" towards a left-hand portion of the second display surface 503" and a second localize audio device 513b" towards the right-hand portion of the second display surface 503". As shown, the positions of the respective localized audio devices at each of the local and remote videoconferencing sites are in virtual alignment with respect to each other. Consequently, a second participant 510a" positioned within an intimate zone 502a" at the remote video conference site 501" can participate in a private or semiprivate conversation with the first participant 510a' at the local video conference site 501' without disturbing or being otherwise perceptible to other participants 510b, 510c at either the local or remote videoconferencing sites. Namely, sounds within the intimate zone 502a' of the first site 501' reliably captured by a microphone of the first localized audio device 513a', whereas unwanted sounds outside of the intimate zone 502a' are rejected or otherwise not reliably captured. Such unwanted sounds can be captured at audio signal levels many decibels below desired audio, such that they result in signals as in a background murmur.

Likewise, sounds within the intimate zone 502a" of the second site 502', being similarly captured by a microphone of the second localized audio device 513a" are converted to audio signals, transported to the first site 501' and selectively reproduced as sounds within the corresponding intimate zone 502a'. Amplitudes and other techniques to shape sound, e.g., by controlling one or more of amplitudes and phases of audio signals can be determined by an audio processing system to prevent sounds from traveling much beyond the intimate zone 502a'.

More than one such intimate videoconferencing zones 502a', 502b' within a large format videoconference system can be established in a like manner. In the illustrative example a second such intimate videoconferencing zone 502b', 502b" is provided at an opposite and of the display surface 503', 503". Sounds within the second intimate zone 502b', 502b" are likewise reliably captured by a microphone of the second localized audio device 513b' and reproduced by one or more speakers of the audio device 513b'. Alternatively or in addition, other videoconferencing zones or sub-regions can be established within each participating scene of the video conference. In the illustrative example, the third localize audio device 515 provides audio coverage within a third region 504' of the local video conference site. A similar localized audio device provides complimentary coverage within a third region 504" of the remote video conference site. In the illustrative example the third localized audio devices 515 are arranged or otherwise configured to provide audio coverage within a region 504 corresponding to a personal proxemic zone.

Any of a number of different microphones or microphone arrays can be used in the localized audio devices 513, 515. Selection of a particular microphone or microphone array can be made according to or otherwise based on an extent and shape of the corresponding video conferencing zone. Likewise, any number of different speakers or speaker arrays can be used in the localized audio devices 513a', 513a", 513b', 513b" (generally 513) and 515. Selection of a particular speaker or speaker or a can be made according to the extent and shape of the corresponding video conferencing zone. Although the localized audio devices 513, 515 are shown as being embedded within the respective display surface 503, it is understood that the localized audio devices 513, 515 can be located together with a video camera array or separate from the video camera array, such that the audio portion of the respective videoconferencing zone is achieved, allowing for a realistic exchange of sounds between sites 501', 501" according to the particular zones. It is also understood that although the localized audio devices 513, 515 are described as including both a microphone and a speaker, other embodiments are possible in which one or more of the microphone in the speaker are separated from each other, such that the audio portion of the respective videoconferencing zone is achieved.

Through selection and positioning of one or more of the microphones and speakers of the localized audio devices 513, 515 different regions within a common scene subject to the videoconference can be established to support respective conversations between videoconference participants as if the participants were at the same location. In some embodiments, audio coverage can be adapted to cover a so-called public region, including substantially an entire area in and around the display surface, e.g., including participants 510a', 510b' and 510c.

Figure 6:
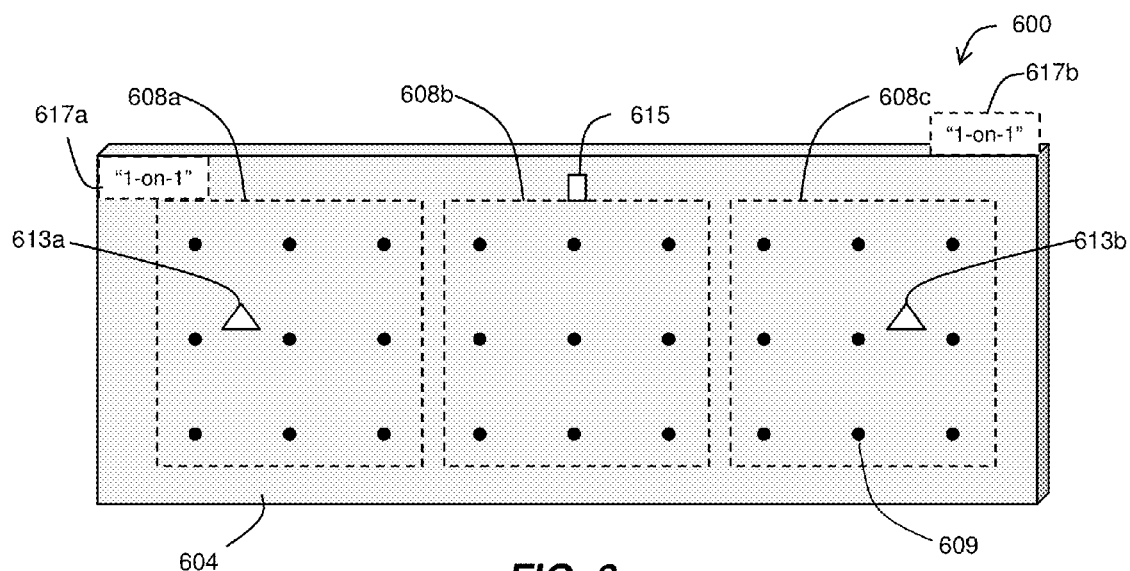
FIG. 6 depicts an illustrative embodiment of a telepresence display.

FIG. 6 depicts an illustrative embodiment of a telepresence display 600. The telepresence display 600 includes a display surface 604. The display surface 604, for example, can be a wall or a substantial portion of a wall of a videoconferencing facility. (As videoconferencing becomes more widely accepted, it is understood that videoconferencing facilities can include virtually any location such as a home a business, or public place such as an educational institution.) For example, videoconferencing terminals at geographically separated business offices can be arranged to share a wall or substantial portion of a wall within each respective facility. Accordingly one facility can peer through its display wall 604 as if it were looking into a geographically separated business office. Employees in the vicinity of the shared wall will be able to communicate visually and audibly as if the participants were in a common facility, with a restriction that participants at each facility remain on their respective sides of the virtual wall or window between the two facilities. Beneficially, participants are able to approach their respective display surface 604, i.e., the virtual window, within a minimum distance that can be chosen to be within the intimate proxemic zone.

The example telepresence display 600 includes three video camera sub arrays 608a, 608b, 608c, each including a 3×3 array of video cameras 609. Using the example LifeCam Show® video camera discussed above, it would be possible to adequately cover a display area of 12.87'×3.21'. The display 600 also includes left and right localized audio devices 613a, 613b and a central wide area audio device 615.

In at the least some embodiments as shown the display 600 can include a visual prompt to notify participants as to the availability and location of localized audio zones. In the illustrative example the display 600 includes a first sign 617a that a left-hand portion of the display surface 604 within the vicinity of the left localized audio device 613a. Likewise the display 600 includes a second sign 617b at the right-hand portion of the display surface 604 within the vicinity of the right localized audio device 613b. Videoconferencing participants can signal each other as to a desirability of participating in a localized or otherwise private conversation at any time during the course of a video conference/telepresence. Such signaling can occur by video gestures such as a hand wave towards the localized audio device and/or a vocal gesture through other audio devices such as a wide area audio device 615. Each of the audio devices 613a, 613b, 615 can include one or more microphones and/or speakers under the control of audio processing equipment, not shown.

Figure 7:
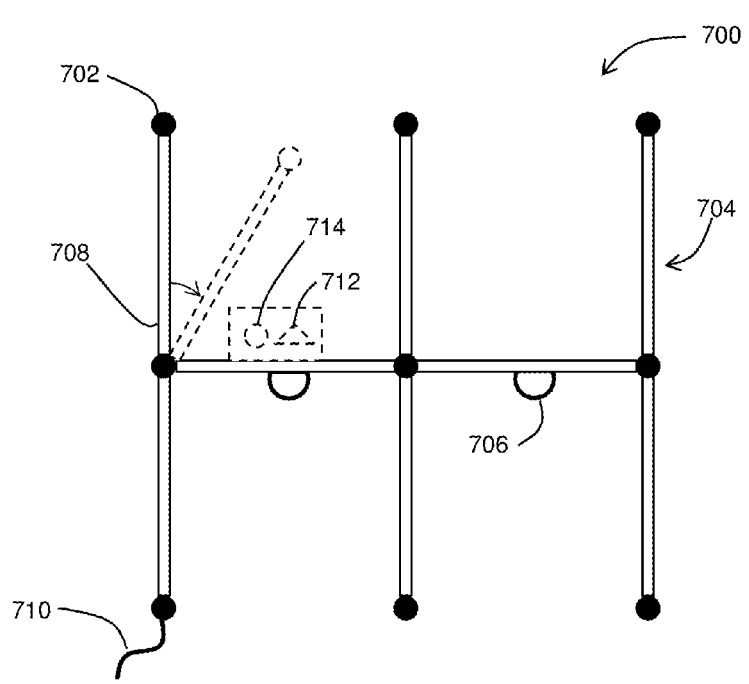
FIG. 7 depicts an illustrative embodiment of a modular video camera array.

FIG. 7 depicts an illustrative embodiment of a modular video camera array 700. The video camera array 700 includes a 3×3 arrangement of video cameras 702. The video cameras 702 are spaced apart from each other and retained in a fixed relationship with respect to each other by a supporting structure 704. In some embodiments the supporting structure 704 is a simple frame providing frame elements including rigid struts 708 fastened together in a configuration to support the 3×3 arrangement of video cameras 702. In some embodiments, the frame includes one or more mounting features 706 to support mounting of the supporting structure 704 to a surface, such as a display surface, e.g., a wall. The mounting features 706 can include one or more of hooks, loops, brackets or other suitable fasteners. In some embodiments, frame elements 708 of the supporting structure 704 can be configurable. For example one or more frame elements 708 of the supporting structure 704 can be folded from a deployed positioned as shown to a compact configuration as might be suitable for storage and for transportation.

The supporting structure 704 can include cabling as may be required for signaling and four electrical power between each of the video cameras 702 of the video camera away 700. In the illustrative example, such cabling is run within internal conduits of the frame elements of the supporting structure 704, and collected in a common location, such as the cable extension 710, or pigtail, as shown.

It is understood that in at least some embodiments the video camera array 700 includes one or more audio devices. In the illustrative example the video camera array 700 includes a microphone 712 and a speaker 714. One or more of the microphone 712 and speaker 714 can be mounted to one or more frame elements 708 of the supporting structure 704.

Figure 8:
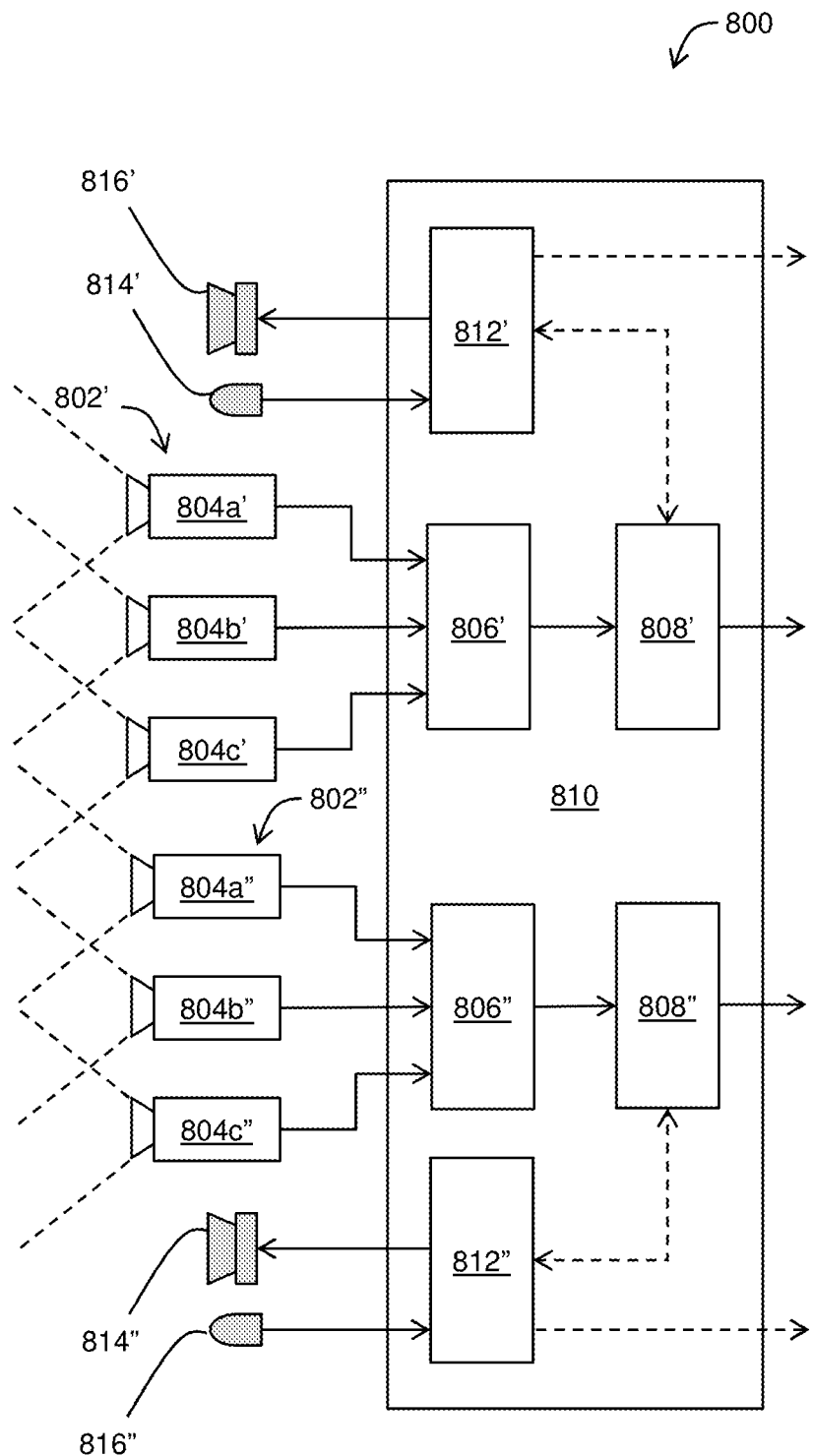
FIG. 8 depicts a schematic block diagram of an illustrative embodiment of a portion of a telepresence system.

FIG. 8 depicts a schematic block diagram of an illustrative embodiment of a portion of a telepresence system 800. The telepresence system 800 includes one or more video camera arrays 802', 802". In the illustrative example a first one by three video camera array 802' is arranged end-to-end with a second one by three video camera array 802". The result is a 1×6 array of video cameras 804a', 804b', 804c', 804a", 804b", 804c" (generally 804). The telepresence system also includes an audio-video processor 810. The audio-video processor 810 includes a first video processor 806' coupled to each of the video cameras 804a', 804b', 804c' of the first video camera array 802'. Likewise, the audio-video processor 810 includes a second video processor 806" coupled to each of the video cameras 804a", 804b", 804c" of the second video camera array 802". Each of the video processors 806', 806" stitches together or otherwise combines respective video images into a composite video image from each of the video cameras 804 of the respective video camera arrays 802', 802".

In some embodiments the audio-video processor 810 also includes a first video encoder 808' coupled to the first video processor 806' and a second video encoder 808" coupled to the second video processor 806" as shown. Each of the video encoders 808', 808" provides encoding to the composite video images into a respective encoded video signal. Examples of video encoding include MPEG encoding schemes. It is understood that in at least some embodiments encoding can include application of security for example by way of encryption, scrambling or other suitable obfuscation of the encoded video signal. The encoded video signal is transported to one or more other telepresence sites participating in a videoconference.

It is understood that the techniques disclosed herein can be applied to support telepresence between more than two sites. It is also understood that the techniques disclosed herein can be applied to any number and arrangement of video cameras 804 to produce one or more stitched video images captured in one or more encoded video signals or streams for network transport between one or more other sites. In some embodiments, the encoded video signals from both a first and second video camera arrays 802", 802" can be combined in a single encoded video signal. This can be accomplished for example by connecting all of the video cameras to a common video processor 806'. A determination as to a number of encoded video streams necessary is at least in part determined by the resolution of the resulting display image. If the image is displayed according to a standard, such as any of the high-definition standards, e.g., 1080i, 1080p, 720p, then a single encoded video signal would suffice. However, if the displayed image is larger, e.g., a multiple of a standard resolution, then more than one encoded video signals can be used, one signal for each standard resolution portion of the display.

An illustrative embodiment the telepresence system 800 includes a first microphone 814' and a first speaker 816' at one end of the first video camera array 802', and a second microphone 814" and a second speaker 816" at an opposite end of the second video camera array 802". The first microphone 814' and the first speaker 816' are coupled to a first audio processor 812'. Likewise, the second microphone 814" and the second speaker 816" are coupled to a second audio processor 812". Each of the first and second audio processors 812', 812" can provide a respective audio interface to an audio communication channel between telepresence sites. The audio channels can be communicated independently as shown or combined for example with one or more of the encoded video signals for a combined encoded audio visual signal. In at least some embodiments, the audio processor 812', 812" identifies a source and or destination of audio signals as originating from or being directed to corresponding microphones 814', 814" and speakers 816', 816" to allow for selective transport and/or processing of such audio signals.

Figure 9:
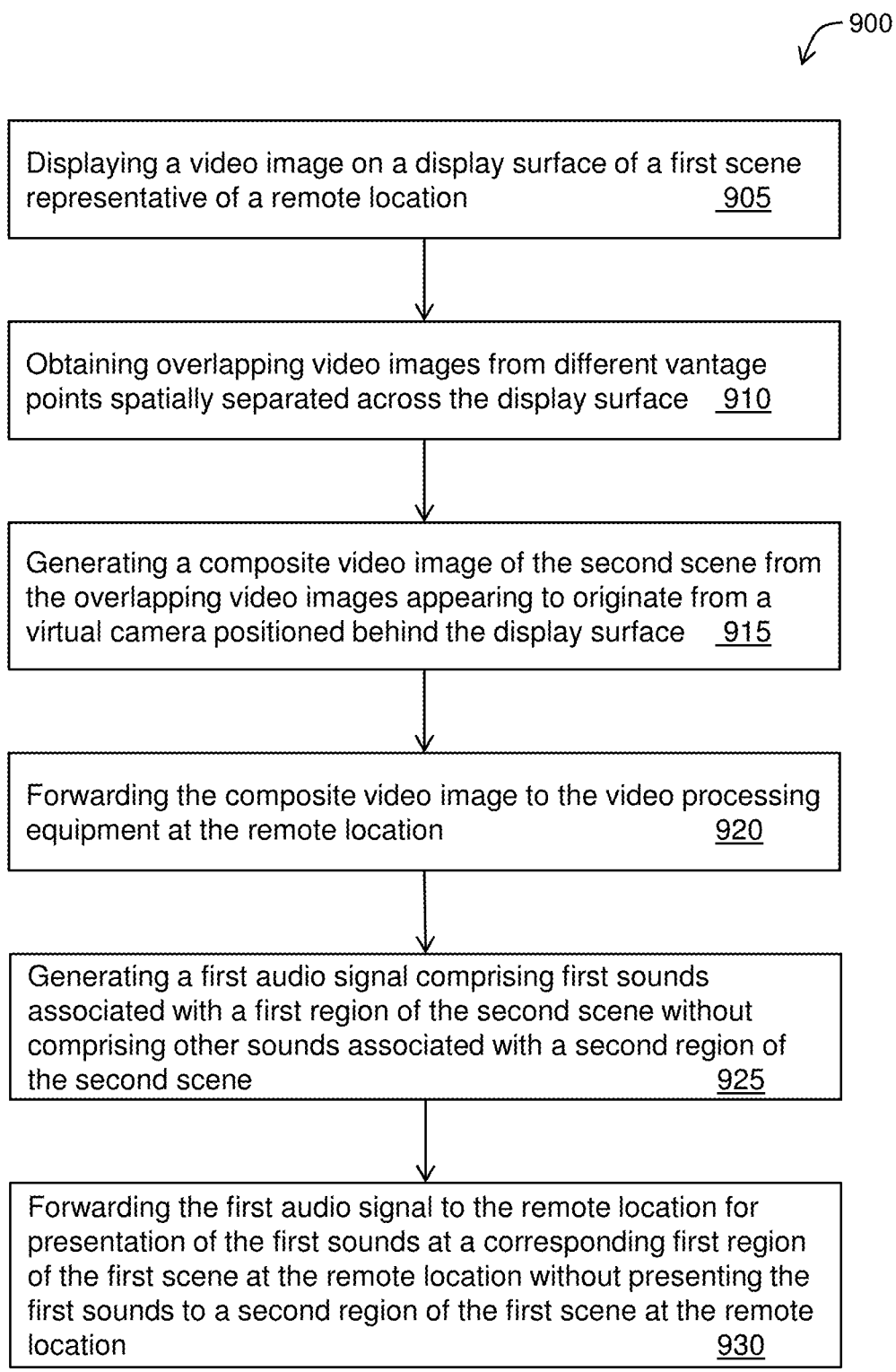
FIG. 9 depicts a flow diagram of an illustrative embodiment of a process supporting telepresence communications within different proxemic zones operating in portions of the system described in FIGS. 1-8.

FIG. 9 depicts a flow diagram of an illustrative embodiment of a process supporting telepresence communications within different proxemic zones operating in portions of the system described in FIGS. 1-8. A video image is displayed on a display surface at 905. The video image can be displayed using any suitable display technology for video images, such as front projection display (FIG. 1), rear projection display, not shown, and other display devices, such as plasma displays, LCD displays, cathode ray tubes and the like. A remote scene is displayed representative of a remote location, such as a similar video conferencing or telepresence facility (e.g., as shown in FIG. 1).

Overlapping video images are obtained from different vantage points spatially separated across the display surface at 910. In particular, the overlapping video images are obtained at a minimum distance from the display surface that fall within one half of the proxemics distance for intimate personal communications (e.g., about 0.25 meters). A composite video image of the local scene is generated from the overlapping video images at 915. An example of such a composite image is shown by the image of a first participant shown in the displayed image 422 (FIG. 4). The composite image represents a plausible composite video image of the local scene that is generated from the overlapping video images, wherein the composite image appears to originate from a virtual non-traditional camera positioned behind the local display surface. An illustration of an example of such a non-traditional virtual camera is represented by the camera 122 of FIG. 1.

The composite video image is forwarded to the video processing equipment at the remote location at 920. Processing of the video image can be accomplished locally, e.g., before transporting a video image signal to a remote location, for example, using the video processor 112' in FIG. 1. Alternatively or in addition, some or all of the video processing can be offloaded to one or more other processors, such as the telepresence hub 1030 (FIG. 10).

A first audio signal representing first sounds associated with a first region of the local scene is generated without representing other sounds associated with a second region of the local scene at 925. The first audio signal is forwarded to the remote location for presentation of the first sounds at a corresponding first region of the remote scene at the remote location without presenting the first sounds to a second region of the remote scene at the remote location at 930.

Figure 10:
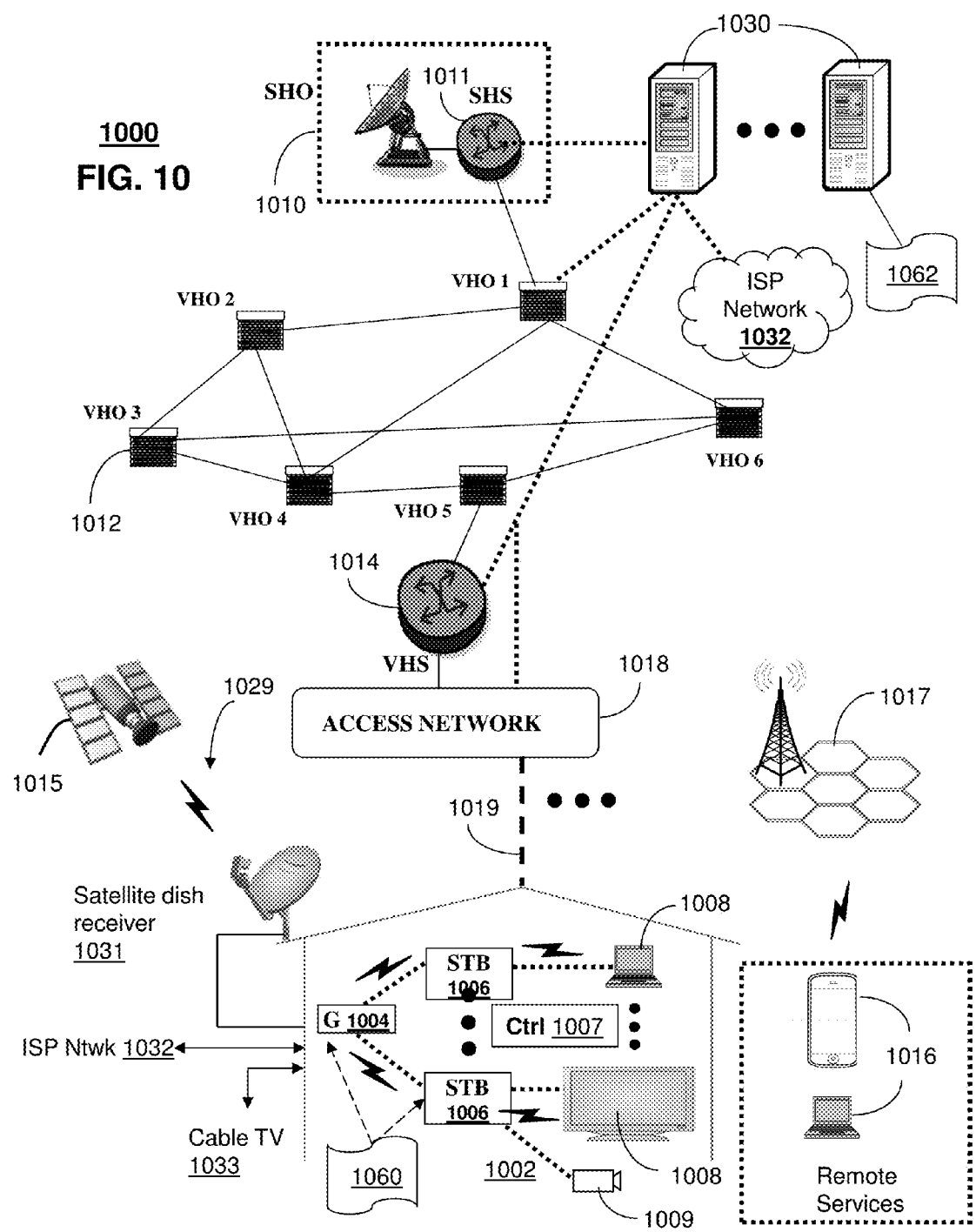
FIGS. 10-11 depict illustrative embodiments of communication systems that provide media services supporting videoconferencing as in FIGS. 1 and 8.

FIG. 10 depicts an illustrative embodiment of a first communication system 1000 for delivering media content.

The communication system 1000 can represent an Internet Protocol Television (IPTV) media system. Communication system 1000 can be overlaid or operably coupled with any of the telepresence or videoconferencing systems disclosed herein, such as in FIG. 1, as another representative embodiment of communication system 1000. A video image of a remote scene is displayed at the display device 1008. Overlapping video images of a local scene are obtained by the video camera array 1009 from different vantage points spatially separated across the display surface. A composite video image is generated, appearing to originate from a virtual camera positioned behind the display surface. A first audio signal is generated including first sounds associated with a first region of the local scene without including other sounds associated with a second region of the local scene. The first audio signal is forwarded to equipment at the remote location for presentation of the first sounds at a corresponding first region of the remote scene at the remote location without presenting the first sounds to a second region of the remote scene at the remote location. Other embodiments are disclosed.

The IPTV media system can include a super head-end office (SHO) 1010 with at least one super headend office server (SHS) 1011 which receives media content from satellite and/or terrestrial communication systems. In the present context, media content can represent, for example, audio content, moving image content such as 2D or 3D videos, video games, virtual reality content, still image content and combinations thereof. The SHS server 1011 can forward packets associated with the media content to one or more video head-end servers (VHS) 1014 via a network of video head-end offices (VHO) 1012 according to a multicast communication protocol.

The VHS 1014 can distribute multimedia broadcast content via an access network 1018 to commercial and/or residential buildings 1002 housing a gateway 1004 (such as a residential or commercial gateway). The access network 1018 can represent a group of digital subscriber line access multiplexers (DSLAMs) located in a central office or a service area interface that provide broadband services over fiber optical links or copper twisted pairs 1019 to buildings 1002. The gateway 1004 can use communication technology to distribute broadcast signals to media processors 1006 such as Set-Top Boxes (STBs) which in turn present broadcast channels to media devices 1008 such as computers or television sets managed in some instances by a media controller 1007 (such as an infrared or RF remote controller). In at least some embodiments, the media devices 1008 includes a telepresence display according to the techniques disclosed herein employing video camera arrays, image stitching and audio partitioning of a videoconference/telepresence scene. An array of video cameras 1009 can be integrated within or disposed along the display surface of the display device 1008.

The gateway 1004, the media processors 1006 and media devices 1008 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 1006 and subsystems of the IPTV media system for services such as video-on-demand (VoD), browsing an electronic programming guide (EPG), or other infrastructure services. One or more of the set-top box 1006 or the gateway 1004 can be configured, for example, by including processing software 1060, in at least some embodiments, to prepare camera mesh of images for images independently obtained by video cameras of the array of video cameras 1009.

A satellite broadcast television system 1029 can be used in the media system of FIG. 10. The satellite broadcast television system can be overlaid, operably coupled with, or replace the IPTV system as another representative embodiment of communication system 1000. In this embodiment, signals transmitted by a satellite 1015 that include media content can be received by a satellite dish receiver 1031 coupled to the building 1002. Modulated signals received by the satellite dish receiver 1031 can be transferred to the media processors 1006 for demodulating, decoding, encoding and/or distributing broadcast channels to the media devices 1008. The media processors 1006 can be equipped with a broadband port to an Internet Service Provider (ISP) network 1032 to enable interactive services such as VoD and EPG as described above.

In yet another embodiment, an analog or digital cable broadcast distribution system such as cable TV system 1033 can be overlaid, operably coupled with, or replace the IPTV system and/or the satellite TV system as another representative embodiment of communication system 1000. In this embodiment, the cable TV system 1033 can also provide Internet, telephony and interactive media services.

The subject disclosure can apply to other present or next generation over-the-air and/or landline media content services system.

Some of the network elements of the IPTV media system can be coupled to one or more computing devices 1030, a portion of which can operate as a web server for providing web portal services over the ISP network 1032 to wireline media devices 1008 or wireless communication devices 1016.

Communication system 1000 can also provide for all or a portion of the computing devices 1030 to function as a video conferencing or telepresence hub (herein referred to as telepresence hub 1030). The telepresence hub 1030 can use computing and communication technology to perform function 1062, which can include coordinating and otherwise supporting establishment of a videoconference or telepresence session. Alternatively or in addition, one or more aspects of the image stitching can be offloaded to the telepresence hub 1030, in which multiple video signals are sent from the video camera array 1009 to the telepresence hub 1030. The media processors 1006 and wireless communication devices 1016 can be provisioned with software functions videoconference or telepresence client applications 1062 to utilize the services of the telepresence hub 1030.

Multiple forms of media services can be offered to media devices over landline technologies such as those described above. Additionally, media services can be offered to media devices by way of a wireless access base station 1017 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE and so on. Other present and next generation wide area wireless access network technologies can be used in one or more embodiments of the subject disclosure.

Figure 11:
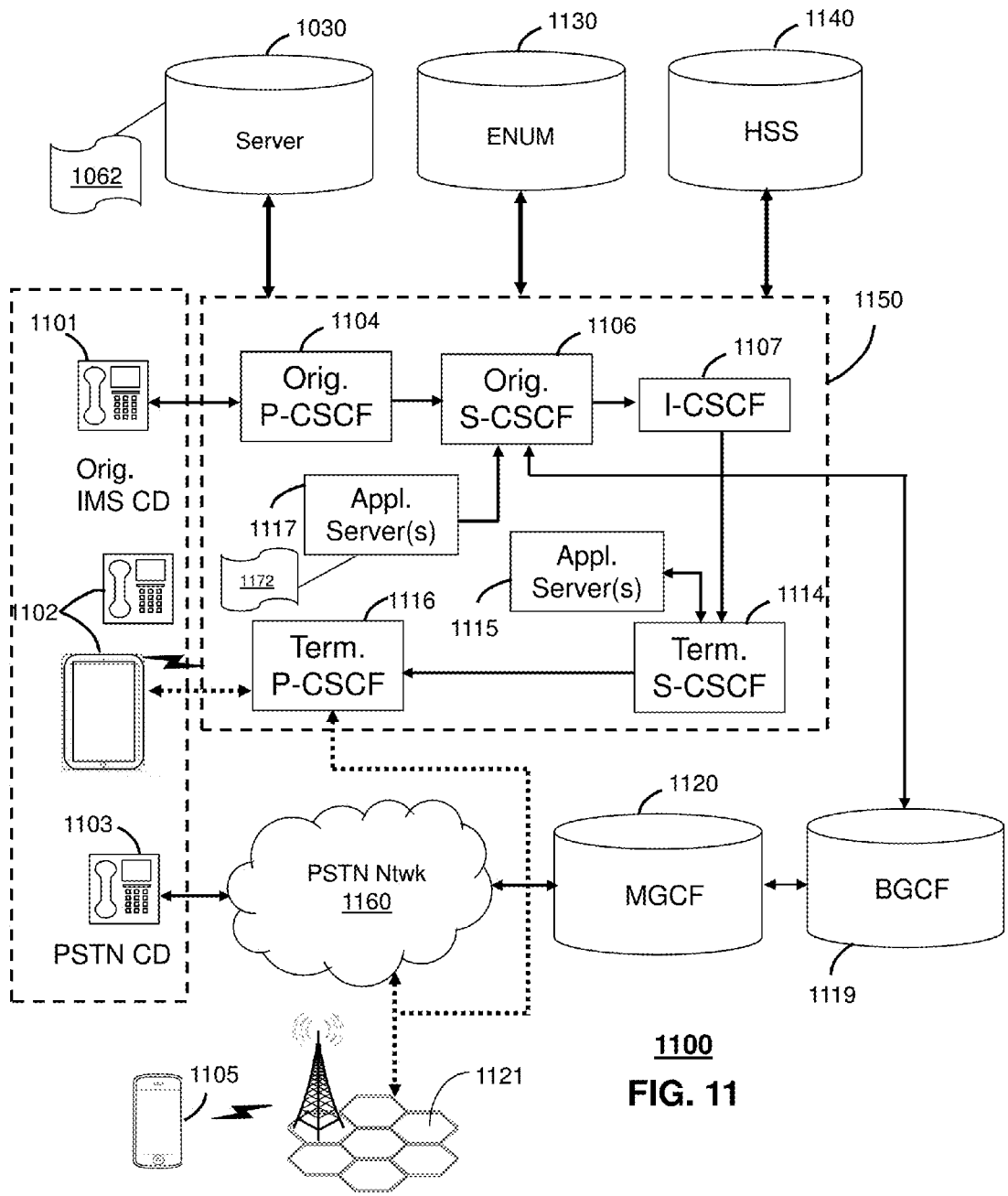

FIG. 11 depicts an illustrative embodiment of a communication system 1100 employing an IP Multimedia Subsystem (IMS) network architecture to facilitate the combined services of circuit-switched and packet-switched systems.

Communication system 1100 can be overlaid or operably coupled with any of the telepresence systems disclosed herein, such as the telepresence system 100 of FIG. 1, and communication system 1000 as another representative embodiment of communication system 1000. One or more video images of a remote scene are transported across the network 1100. Overlapping video images of a local scene are obtained from different vantage points spatially separated across the display surface. A composite video image is generated, in whole or in party by one or more of the functions 1062 on the server 1030 or the functions 1172 on the application server 1117. The composite video image appears to originate from a virtual camera positioned behind the display surface. A first audio signal is generated including first sounds associated with a first region of the local scene without including other sounds associated with a second region of the local scene. The first audio signal is forwarded by the communication system 1100 to equipment at the remote location for presentation of the first sounds at a corresponding first region of the remote scene at the remote location without presenting the first sounds to a second region of the remote scene at the remote location.

Communication system 1100 can comprise a Home Subscriber Server (HSS) 1140, a tElephone NUmber Mapping (ENUM) server 1130 and other network elements of an IMS network 1150. The IMS network 1150 can establish communications between IMS-compliant communication devices (CDs) 1101, 1102, Public Switched Telephone Network (PSTN) CDs 1103, 1105 and combinations thereof by way of a Media Gateway Control Function (MGCF) 1120 coupled to a PSTN network 1160. The MGCF 1120 need not be used when a communication session involves IMS CD to IMS CD communications. A communication session involving at least one PSTN CD may utilize the MGCF 1120.

IMS CDs 1101, 1102 can register with the IMS network 1150 by contacting a Proxy Call Session Control Function (P-CSCF) which communicates with an interrogating CSCF (I-CSCF), which in turn, communicates with a Serving CSCF (S-CSCF) to register the CDs with the HSS 1140. To initiate a communication session between CDs, an originating IMS CD 1101 can submit a Session Initiation Protocol (SIP INVITE) message to an originating P-CSCF 1104 which communicates with a corresponding originating S-CSCF 1106. The originating S-CSCF 1106 can submit the SIP INVITE message to one or more application servers (aSs) 1117 that can provide a variety of services to IMS subscribers.

For example, the application servers 1117 can be used to perform originating call feature treatment functions on the calling party number received by the originating S-CSCF 1106 in the SIP INVITE message. Originating treatment functions can include determining whether the calling party number has international calling services, call ID blocking, calling name blocking, 7-digit dialing and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1106 can submit queries to the ENUM system 1130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1107 to submit a query to the HSS 1140 to identify a terminating S-CSCF 1114 associated with a terminating IMS CD such as reference 1102. Once identified, the I-CSCF 1107 can submit the SIP INVITE message to the terminating S-CSCF 1114. The terminating S-CSCF 1114 can then identify a terminating P-CSCF 1116 associated with the terminating CD 1102. The P-CSCF 1116 may then signal the CD 1102 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 11 may be interchangeable. It is further noted that communication system 1100 can be adapted to support video conferencing. In addition, communication system 1100 can be adapted to provide the IMS CDs 1101, 1102 with the multimedia and Internet services of communication system 1000 of FIG. 10.

If the terminating communication device is instead a PSTN CD such as CD 1103 or CD 1105 (in instances where the cellular phone only supports circuit-switched voice communications), the ENUM system 1130 can respond with an unsuccessful address resolution which can cause the originating S-CSCF 1106 to forward the call to the MGCF 1120 via a Breakout Gateway Control Function (BGCF) 1119. The MGCF 1120 can then initiate the call to the terminating PSTN CD over the PSTN network 1160 to enable the calling and called parties to engage in voice and/or data communications.

It is further appreciated that the CDs of FIG. 11 can operate as wireline or wireless devices. For example, the CDs of FIG. 11 can be communicatively coupled to a cellular base station 1121, a femtocell, a WiFi router, a Digital Enhanced Cordless Telecommunications (DECT) base unit, or another suitable wireless access unit to establish communications with the IMS network 1150 of FIG. 11. The cellular access base station 1121 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 11.

Cellular phones supporting LTE can support packet-switched voice and packet-switched data communications and thus may operate as IMS-compliant mobile devices. In this embodiment, the cellular base station 1121 may communicate directly with the IMS network 1150 as shown by the arrow connecting the cellular base station 1121 and the P-CSCF 1116.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The telepresence hub 1030 of FIG. 10 can be operably coupled to the second communication system 1100 for purposes similar to those described above. The telepresence hub 1030 can perform function 1062 and thereby provide videoconferencing and/or telepresence services to the CDs 1101, 1102, 1103 and 1105 of FIG. 11. CDs 1101, 1102, 1103 and 1105, which can be adapted with software to perform videoconferencing and/or telepresence function 1170 to utilize the services of the telepresence hub 1030. The telepresence hub 1030 can be an integral part of the application server(s) 1117 performing function 1172, which can be substantially similar to function 1060 and adapted to the operations of the IMS network 1150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 12:
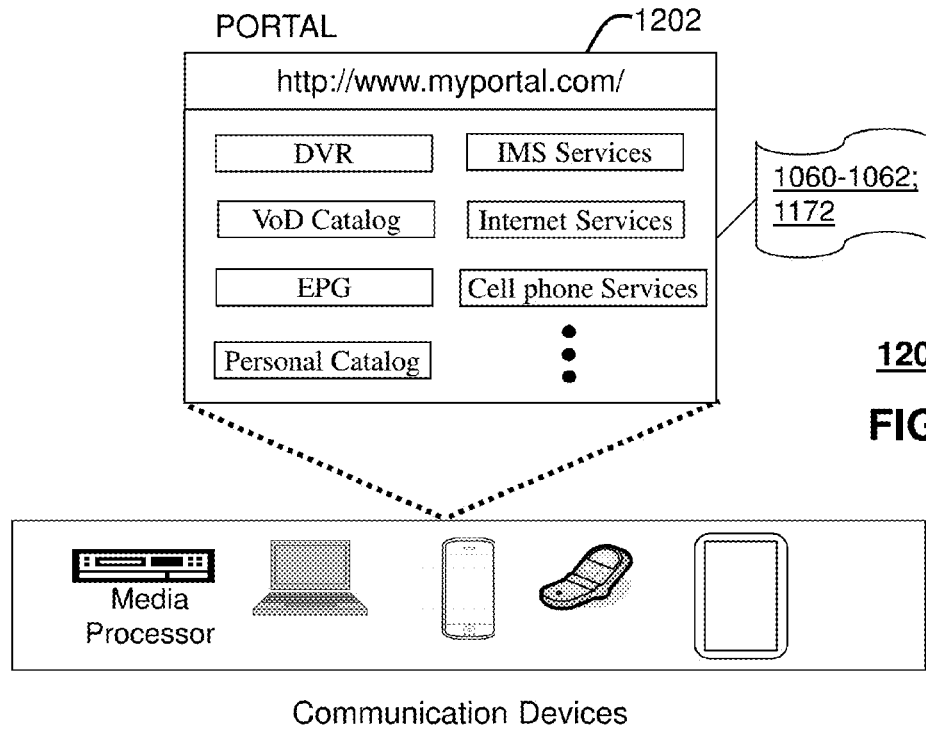
FIG. 12 depicts an illustrative embodiment of a web portal for interacting with the communication systems to support videoconferencing and/or telepresence as in FIGS. 1 and 8.

FIG. 12 depicts an illustrative embodiment of a web portal 1202 which can be hosted by server applications operating from the computing devices 1030 of the communication system 1000 illustrated in FIG. 10. Communication system 1000 can be overlaid or operably coupled with system 1100, communication 1000 and/or communication system 1100 as another representative embodiment of any of the videoconferencing and/or telepresence systems disclosed herein, such as the telepresence system 100 of FIG. 1, communication 1000 and/or communication system 1100. The web portal can be used to access one or more of the functions 1160, 1162 and 1172, for example, in generating composite video images, audio signals, and the like. The web portal 1202 can be used for managing services of communication systems 1000-1100. A web page of the web portal 1202 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 10-11. The web portal 1202 can be configured, for example, to access a media processor 1006 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1006. The web portal 1202 can also be used for provisioning IMS services described earlier, provisioning Internet services, provisioning cellular phone services, and so on.

The web portal 1202 can further be utilized to manage and provision software applications 1060-1062, and 1172 to adapt these applications as may be desired by subscribers and service providers of communication systems 1000-1100.

Figure 13:
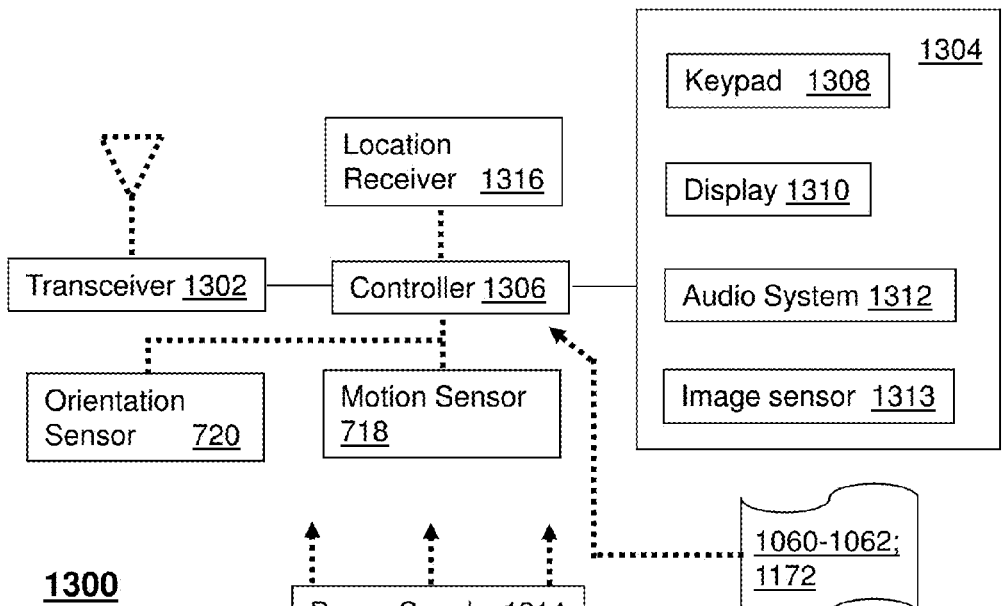
FIG. 13 depicts an illustrative embodiment of a communication device.

FIG. 13 depicts an illustrative embodiment of a communication device 1300. Communication device 1300 can serve in whole or in part as an illustrative embodiment of the devices depicted in FIGS. 1, and 10-11. The communication device can be used to transport one or more video signals and audio signals between participants of a videoconference or telepresence session.

To enable these features of supporting videoconferencing and/or telepresence services, communication device 1300 can comprise a wireline and/or wireless transceiver 1302 (herein transceiver 1302), a user interface (UI) 1304, a power supply 1314, a location receiver 1316, a motion sensor 1318, an orientation sensor 1320, and a controller 1306 for managing operations thereof. The transceiver 1302 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1302 can also be adapted to support circuit-switched wireline access technologies (such as PSTN), packet-switched wireline access technologies (such as TCP/IP, VoIP, etc.) and combinations thereof.

The UI 1304 can include a depressible or touch-sensitive keypad 1308 with a navigation mechanism such as a roller ball, a joystick, a mouse, or a navigation disk for manipulating operations of the communication device 1300. The keypad 1308 can be an integral part of a housing assembly of the communication device 1300 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 1310 such as monochrome or color LCD (Liquid Crystal Display), OLED (Organic Light Emitting Diode) or other suitable display technology for conveying images to an end user of the communication device 1300. In an embodiment where the display 1310 is touch-sensitive, a portion or all of the keypad 1308 can be presented by way of the display 1310 with navigation features.

The display 1310 can use touch screen technology to also serve as a user interface for detecting user input. As a touch screen display, the communication device 1300 can be adapted to present a user interface with graphical user interface (GUI) elements that can be selected by a user with a touch of a finger. The touch screen display 1310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1310 can be an integral part of the housing assembly of the communication device 1300 or an independent device communicatively coupled thereto by a tethered wireline interface (such as a cable) or a wireless interface.

The UI 1304 can also include an audio system 1312 that utilizes audio technology for conveying low volume audio (such as audio heard in proximity of a human ear) and high volume audio (such as speakerphone for hands free operation). The audio system 1312 can further include a microphone for receiving audible signals of an end user. The audio system 1312 can also be used for voice recognition applications. The UI 1304 can further include an image sensor 713 such as a charged coupled device (CCD) camera for capturing still or moving images.

The power supply 1314 can utilize common power management technologies such as replaceable and rechargeable batteries, supply regulation technologies and/or charging system technologies for supplying energy to the components of the communication device 1300 to facilitate long-range or short-range portable applications. Alternatively, or in combination, the charging system can utilize external power sources such as DC power supplied over a physical interface such as a USB port or other suitable tethering technologies.

The location receiver 1316 can utilize location technology such as a global positioning system (GPS) receiver capable of assisted GPS for identifying a location of the communication device 1300 based on signals generated by a constellation of GPS satellites, which can be used for facilitating location services such as navigation. The motion sensor 1318 can utilize motion sensing technology such as an accelerometer, a gyroscope, or other suitable motion sensing technology to detect motion of the communication device 1300 in three-dimensional space. The orientation sensor 1320 can utilize orientation sensing technology such as a magnetometer to detect the orientation of the communication device 1300 (north, south, west and east, as well as combined orientations in degrees, minutes, or other suitable orientation metrics).

The communication device 1300 can use the transceiver 1302 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 1306 can utilize computing technologies such as a microprocessor, a digital signal processor (DSP), programmable gate arrays, application specific integrated circuits and/or a video processor with associated storage memory such as Flash, ROM, RAM, SRAM, DRAM or other storage technologies for executing computer instructions, controlling, and processing data supplied by the aforementioned components of the communication device 1300.

Other components not shown in FIG. 13 can be used in one or more embodiments of the subject disclosure. For instance, the communication device 1300 can include a reset button (not shown). The reset button can be used to reset the controller 1306 of the communication device 1300. In yet another embodiment, the communication device 1300 can also include a factory default setting button positioned, for example, below a small hole in a housing assembly of the communication device 1300 to force the communication device 1300 to re-establish factory settings. In this embodiment, a user can use a protruding object such as a pen or paper clip tip to reach into the hole and depress the default setting button. The communication device 1300 can also include a slot for adding or removing an identity module such as a Subscriber Identity Module (SIM) card. SIM cards can be used for identifying subscriber services, executing programs, storing subscriber data, and so forth.

The communication device 1300 as described herein can operate with more or less of the circuit components shown in FIG. 13. These variant embodiments can be used in one or more embodiments of the subject disclosure.

The communication device 1300 can be adapted to perform the functions of the media processor 1006, the media devices 1008, or the portable communication devices 1016 of FIG. 10, as well as the IMS CDs 1101-1102 and PSTN CDs 1103-1105 of FIG. 11. It will be appreciated that the communication device 1300 can also represent other devices that can operate in communication systems 1000-1100 of FIGS. 10-11 such as a gaming console and a media player.

The communication device 1300 shown in FIG. 13 or portions thereof can serve as a representation of one or more of the devices of system of FIGS. 1 and/or 8, communication system 1000, and communication system 1100. In addition, the controller 1306 can be adapted in various embodiments to perform the functions 1060, 1062 and 1172, respectively.

Upon reviewing the aforementioned embodiments, it would be evident to an artisan with ordinary skill in the art that said embodiments can be modified, reduced, or enhanced without departing from the scope of the claims described below. For example, the videoconferencing or telepresence techniques can be applied to remote learning applications in which a scene containing an educator is shared by way of telepresence with one or more remote learner locations. The educator telepresence facility can include more than one display surface, one for each different remote learning site, whereas each remote learner site can include the same display surface corresponding to the educator telepresence facility. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 14:
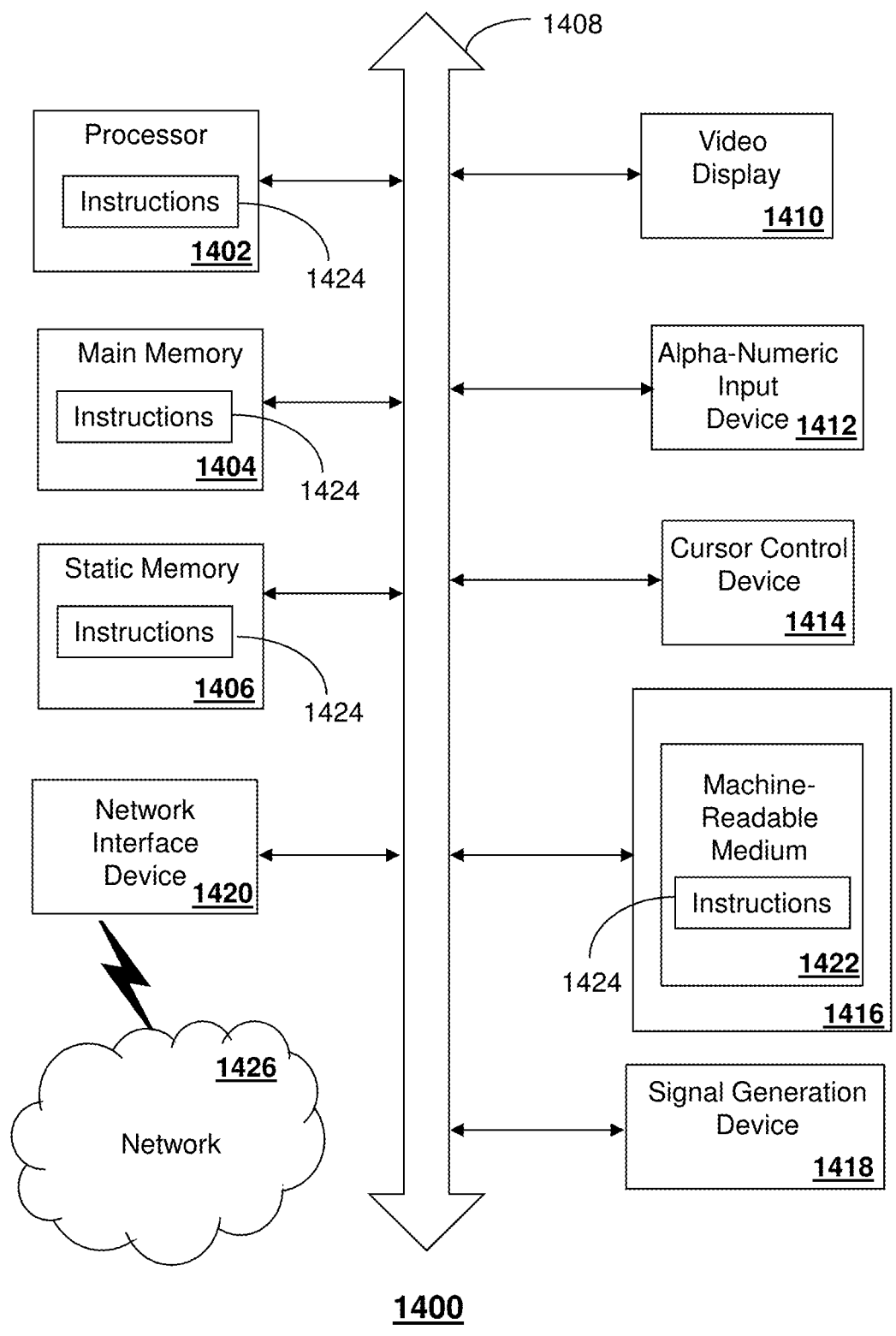
FIG. 14 is a diagrammatic representation of a machine in the form of a computer system within which a set of instructions, when executed, may cause the machine to perform any one or more of the methods described herein.

FIG. 14 depicts an exemplary diagrammatic representation of a machine in the form of a computer system 1400 within which a set of instructions, when executed, may cause the machine to perform any one or more of the methods describe above. One or more instances of the machine can operate, for example, as the telepresence hub 1030, media processor 1006, video processors 112', 112", communication processors 116', 116", video processors 806', 806", video encoders 808', 808", audio video processor 810, audio processors 812', 812" and other devices of FIGS. 1-13. In some embodiments, the machine may be connected (e.g., using a network 1426) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor (or controller) 1402 (e.g., a central processing unit (CPU), a graphics processing unit (GPU, or both), a main memory 1404 and a static memory 1406, which communicate with each other via a bus 1408. The computer system 1400 may further include a display unit 810 (e.g., a liquid crystal display (LCD), a flat panel, or a solid state display. The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 820. In distributed environments, the embodiments described in the subject disclosure can be adapted to utilize multiple display units 1410 controlled by two or more computer systems 1400. In this configuration, presentations described by the subject disclosure may in part be shown in a first of the display units 1410, while the remaining portion is presented in a second of the display units 1410.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406 and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a memory that stores executable instructions; and
   a processor communicatively coupled to the memory, wherein the processor, responsive to executing the executable instructions, performs operations comprising:
   capturing first input audio from a first source at a first personal zone via a first microphone device of a first two-way communication system at a first location of a display surface and second input audio from a second source at a second personal zone via a second microphone device of a second two-way communication system at a second location of the display surface;
   capturing first video from a plurality of cameras at the display surface;
   transmitting the first input audio, the second input audio, and the first video to a remote location for reproduction at a second device;
   receiving first output audio, second output audio, and second video from the second device at the remote location;
   presenting the second video at the display surface; and presenting the first output audio in the first personal zone via a first speaker device at the first location of the display surface and the second output audio in the second personal zone via a second speaker device at the second location of the display surface, wherein the first personal zone is proximate to the first location of the display surface, wherein the second personal zone is proximate to the second location of the display surface, wherein the first two-way communication system does not capture sound from the second personal zone and does not reproduce sound that is audible in the second personal zone, and wherein the second two-way communication system does not capture sound from the first personal zone and does not reproduce sound that is audible in the first personal zone.

2. The device of claim 1, wherein plurality of cameras are located in spatially separated areas across the display surface.

3. The device of claim 1, wherein the first video comprises a plurality of overlapping video images of a local scene observable from a vantage point of the display surface.

4. The device of claim 3, wherein the operations further comprise generating the first video as a composite video image of the local scene from the plurality of overlapping video images.

5. The device of claim 4, wherein the operations further comprise:
   determining a distance of an object from the display surface; and
   generating the composite video image of the local scene responsive to the distance of the object.

6. The device of claim 5, wherein the determining of the distance of the object within the local scene comprises performing a parallax interpretation of the object from respective fields of view of different video cameras of the plurality of cameras.

7. The device of claim 1, wherein the first personal zone comprises an area extending away from the first location across the display surface to a distance of about 0.3 meters from the first location.

8. The device of claim 1, further comprising an audio processor for performing a first signal processing function on the first output audio of the first two-way communication system to prevent the second microphone from capturing the first output audio from the first two-way communication system at the second personal zone.

9. The device of claim 8, wherein the audio processor further performs a second signal processing function on the first input audio of the first two-way communication system to eliminate the second output audio of the second two-way communication system from being captured in the first personal zone.

10. The device of claim 1, further comprising a supporting structure coupled to the plurality of cameras, wherein the supporting structure is mountable to the display surface and wherein the supporting structure maintains the plurality of cameras in a fixed arrangement when the supporting structure is mounted to the display surface.

11. A method comprising:
    capturing, by a system comprising a processor, first input audio from a first source at a first personal zone via a first microphone device of a first two-way communication system at a first location of a display surface and second input audio from a second source at a second personal zone via a second microphone device of a second two-way communication system at a second location of the display surface, wherein the first source is a first speaker and the second source is a second speaker;
    generating, by the system, first output audio in the first personal zone via a first speaker device of the first two-way communication system at the first location of the display surface and second output audio in the second personal zone via a second speaker device of the second two-way communication system at the second location of the display surface, wherein the first personal zone is proximate to the first location of the display surface, wherein the second personal zone is proximate to the second location of the display surface, wherein the first two-way communication system does not capture sound from the second personal zone and does not reproduce sound that is audible in the second personal zone, and wherein the second two-way communication system does not capture sound from the first personal zone and does not reproduce sound that is audible in the first personal zone; and
    forwarding, by the system, the first input audio and the second input audio to audio processing equipment at a remote location for presentation.

12. The method of claim 11, wherein the first input audio is presented at a first region of the remote location and the second input audio is presented at a second region of the remote location.

13. The method of claim 12, further comprising:
    receiving, by the system, from the audio processing equipment at the remote location, third input audio associated with the first region of the remote location without representing other sounds associated with a second region of the remote location; and
    reproducing, by the system, at the first personal zone, the third input audio, wherein vocal communication is supported between a first participant positioned within the first personal zone and a second participant positioned within the first region of the remote location.

14. The method of claim 13, wherein the third input audio is reproduced by the first speaker device.

15. The method of claim 13, wherein the first personal zone comprises an area extending away from the first location to a distance of about 0.3 meters.

16. The method of claim 11, wherein the system further comprises a display with a plurality of cameras at a display surface.

17. The method of claim 16, further comprising capturing first video from the plurality of cameras at the display surface.

18. A computer-readable storage device comprising instructions that when executed by a processor, cause the processor to perform operations comprising:

capturing first input audio from a first source at a first personal zone via a first microphone device of a first two-way communication system at a first location of a display surface and second input audio from a second source at a second personal zone via a second microphone device of a second two-way communication system at a second location of the display surface;

transmitting the first input audio and the second input audio to a remote location for reproduction at a second device;

receiving first output audio and second output audio from the second device at the remote location; and presenting the first output audio in the first personal zone via a first speaker device at the first location of the display surface and the second output audio in the second personal zone via a second speaker device at the second location of the display surface, wherein the first personal zone is proximate to the first location of the display surface, wherein the second personal zone is proximate to the second location of the display surface, wherein the first two-way communication system does not capture sound from the second personal zone and does not reproduce sound that is audible in the second personal zone, and wherein the second two-way communication system does not capture sound from the first personal zone and does not reproduce sound that is audible in the first personal zone.

19. The computer-readable storage device of claim 18, wherein the first input audio is presented at a first region at a remote location and the second input audio is presented at a second region of the remote location.

20. The computer-readable storage device of claim 18, wherein the first personal zone comprises an area extending away from the first location to a distance of about 0.3 meters.

* * * * *